No. 865,737.

PATENTED SEPT. 10, 1907.

R. WEUTSCH.
BELT SHIFTER.
APPLICATION FILED DEC. 17, 1906.

2 SHEETS—SHEET 1.

Witnesses
W. W. Rockwell
F. G. Smith

Inventor
Robert Weutsch
By
Attorneys

No. 865,737. PATENTED SEPT. 10, 1907.
R. WENTSCH.
BELT SHIFTER.
APPLICATION FILED DEC. 17, 1906.

2 SHEETS—SHEET 2.

Witnesses
W. S. Rockwell
H. G. Smith

Inventor
Robert Wentsch

By Chandlee Chandlee
Attorneys

THE NORRIS PETERS CO., WASHINGTON, D. C.

UNITED STATES PATENT OFFICE.

ROBERT WENTSCH, OF BUTLER, SOUTH DAKOTA.

BELT-SHIFTER.

No. 865,737. Specification of Letters Patent. Patented Sept. 10, 1907.

Application filed December 17, 1906. Serial No. 348,216.

*To all whom it may concern:*

Be it known that I, ROBERT WENTSCH, a citizen of the United States, residing at Butler, in the county of Day, State of South Dakota, have invented certain new and useful Improvements in Belt-Shifters; and I do hereby declare the following to be a full, clear, and exact description of the invention, such as will enable others skilled in the art to which it appertains to make and use the same.

This invention relates to belt shifting devices and more particularly to that class which are designed to be employed in connection with a traction engine to enable the drive belt which communicates the power from the engine to the threshing machine to be quickly disengaged from the drive wheel of the engine, and the primary object of the invention is to provide an extremely simple device of this class which will be rapid and positive in its action.

Broadly speaking, the invention resides in the provision of a crank rod which carries at one of its ends a roller for engagement with the belt and is connected at its other crank end with one arm of an angle lever which lever is designed to be rocked by an operating lever with which the other arm of the angle lever is connected by means of a connecting rod.

Figure 1:
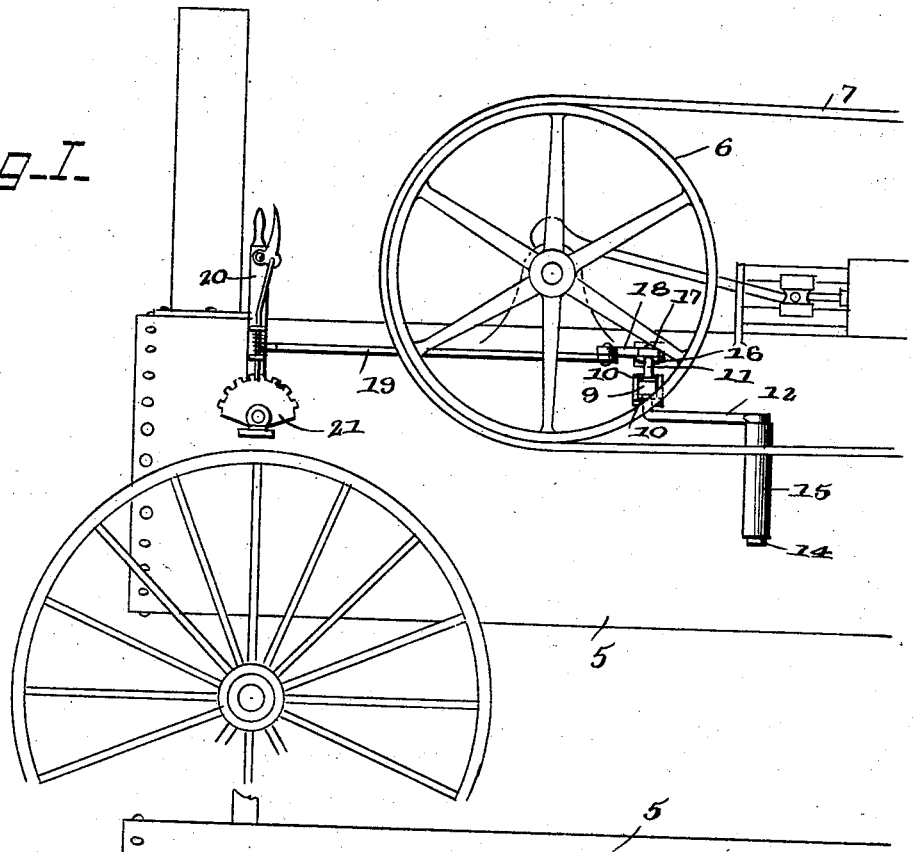
Figure 2:
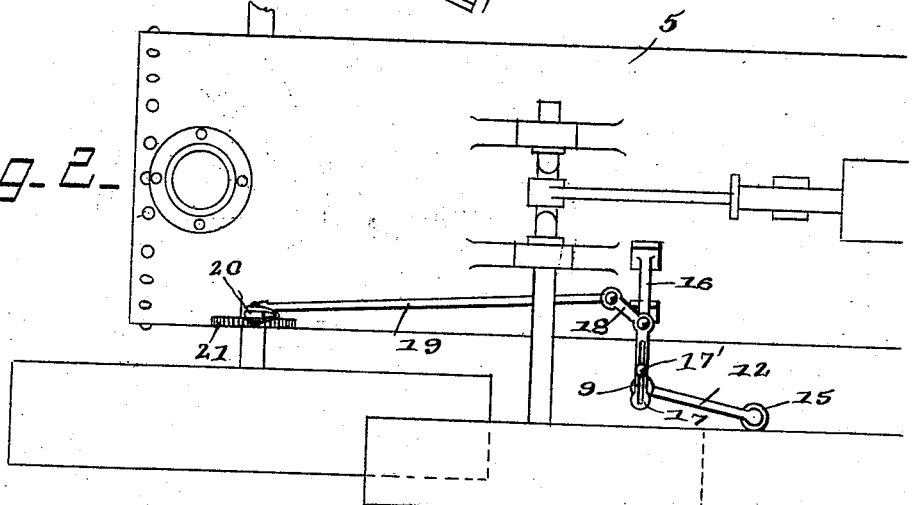
Figure 3:
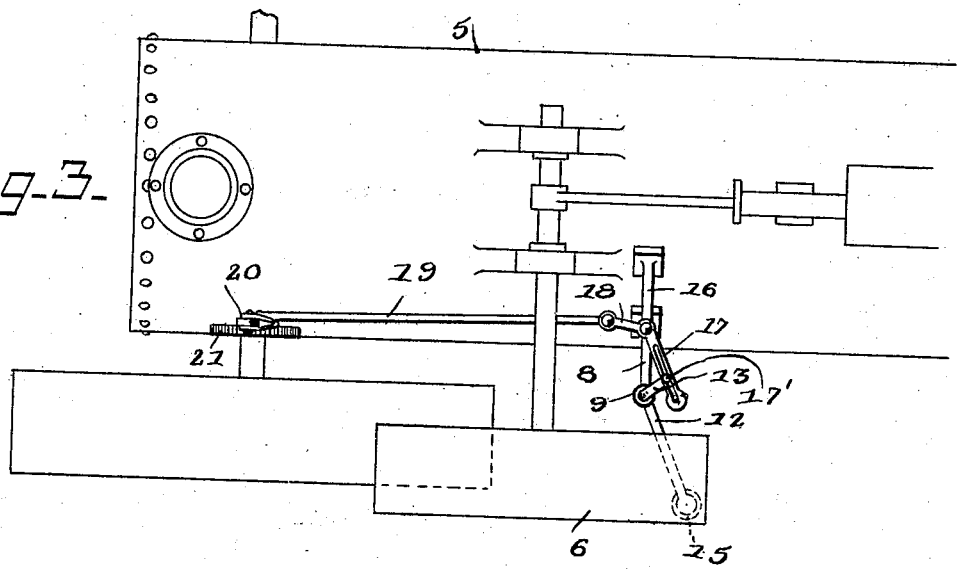
Figure 4:
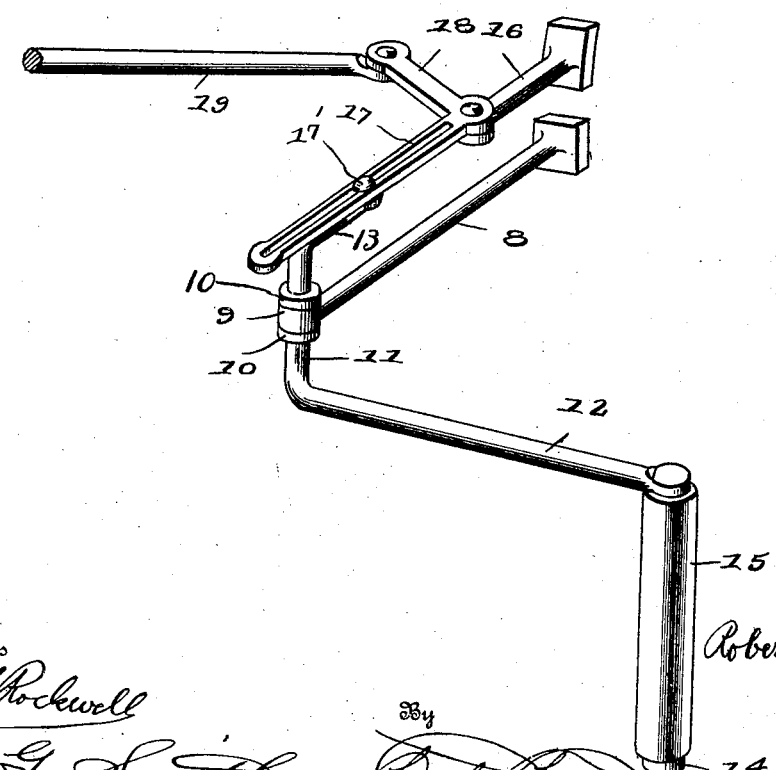

In the accompanying drawings: Figure 1 is a side elevation of a traction engine showing my belt shifter applied thereto. Fig. 2 is a top plan view thereof, the shifter being shown in position ready to shift the belt. Fig. 3 is a view similar to Fig. 2, but showing the position of the shifter after the belt has been thrown from the drive pulley, and Fig. 4 is a detail perspective view of the shifter removed from the traction engine.

Referring more specifically to the drawings, the numeral 5 denotes the boiler casing of a traction engine and 6 the drive pulley of the engine, there being the usual belt 7 engaged around the pulley and connected with a pulley on the threshing machine (not shown).

A bracket arm 8 extends from that side of the boiler casing of the traction engine at which the drive wheel is located and upon the outer end of the arm is formed an apertured head 9 which is confined between columns 10 formed upon a rod 11 which is engaged through the aperture in the head of the bracket. This rod is provided at one of its ends with a crank arm 12 and at its other end with a crank arm 13, the said arms being extended at right angles with respect to each other. At its extreme outer end the arm 12 is provided with a short stub shaft 14 upon which is rotatably journaled a roller 15, the said roller being disposed vertically and at right angles to the arm 12 and being designed for engagement with the adjacent edge of the belt when it is desired to shift the same, as will be presently explained.

A second bracket arm 16 projects outwardly from the boiler casing of the traction engine and above the bracket arm 8 and pivoted in a horizontal plane at the outer end of the bracket arm 16 is an angle lever comprising arms 17 and 18, the arm 17 being slotted for the reception of a pin 17′ at the extreme inner end of the crank arm 13 and the arm 18 being pivotally connected to one end of a rod 19. The other end of the rod 19 is pivotally connected to a lever 20 above the pivot point for the same, and this lever is pivoted at its lower end to a segmental rack 21 which, together with the lever, is located at a point where it may be easily reached by the engineer of the traction engine.

The roller 15 is normally out of engagement with the belt or barely touches the same and it will be readily understood that by imparting a forward rocking movement to the operating lever 20, the angle lever will be rocked to a corresponding degree to throw the crank arm 12 and the roller carried thereby outwardly thereby throwing the belt from its engagement with the drive pulley.

What is claimed is:

In a device of the class described, the combination with a drive belt, of a rod having crank ends, a roller rotatably carried by one of the crank ends of the rod and arranged for engagement at times with the belt, an angle lever having one of its arms connected with the other crank end of the rod, and means connected with the other arm of the angle lever for rocking the same to rock the rod and cause the roller to shift the belt.

In testimony whereof, I affix my signature, in presence of two witnesses.

ROBERT WENTSCH.

Witnesses:
C. B. KNOTT,
ALFRED MOXNESS.